Sept. 22, 1936.  H. BOLD  2,055,330
VEHICLE BRAKE
Filed March 11, 1935  2 Sheets-Sheet 1
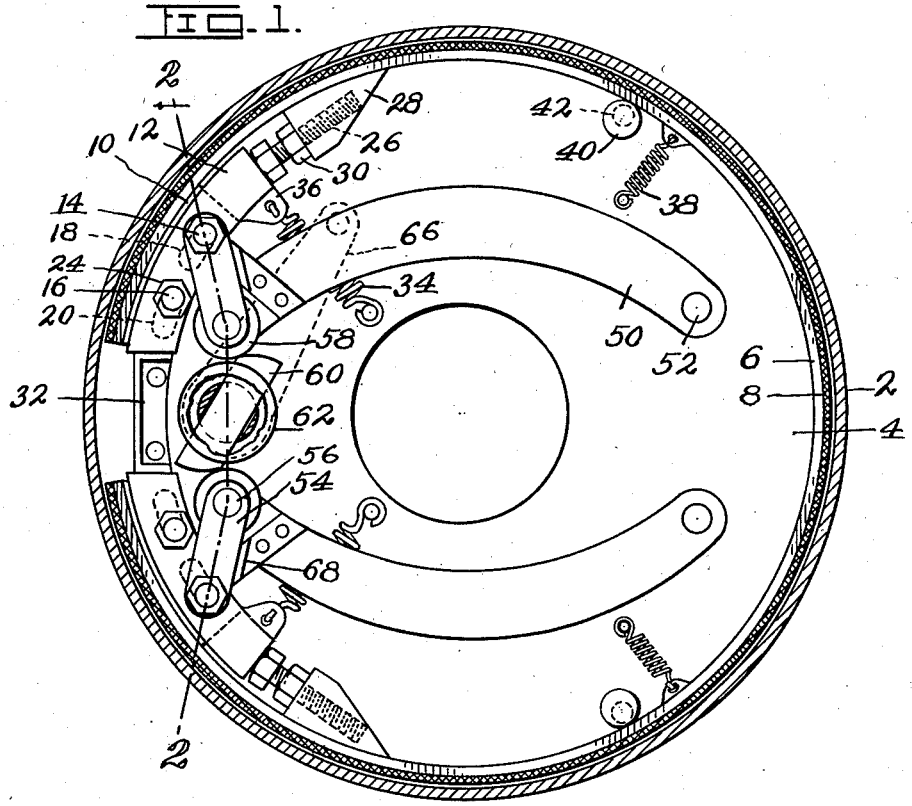
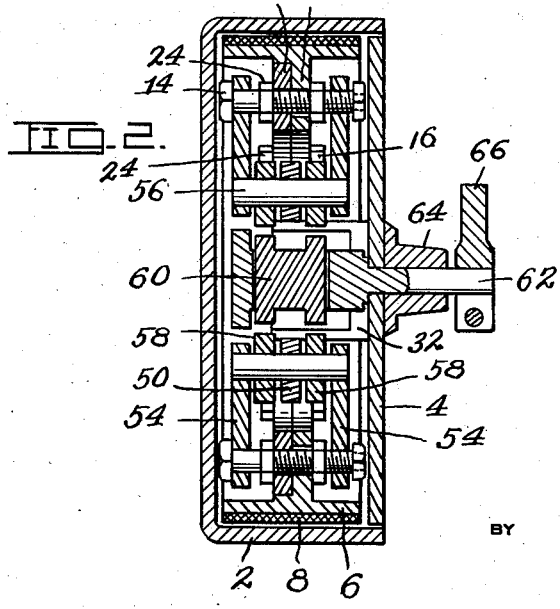
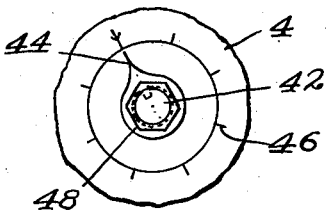
INVENTOR:
Herbert Bold,
BY F. G. Fischer,
ATTORNEY.

Sept. 22, 1936.    H. BOLD    2,055,330
VEHICLE BRAKE
Filed March 11, 1935    2 Sheets-Sheet 2
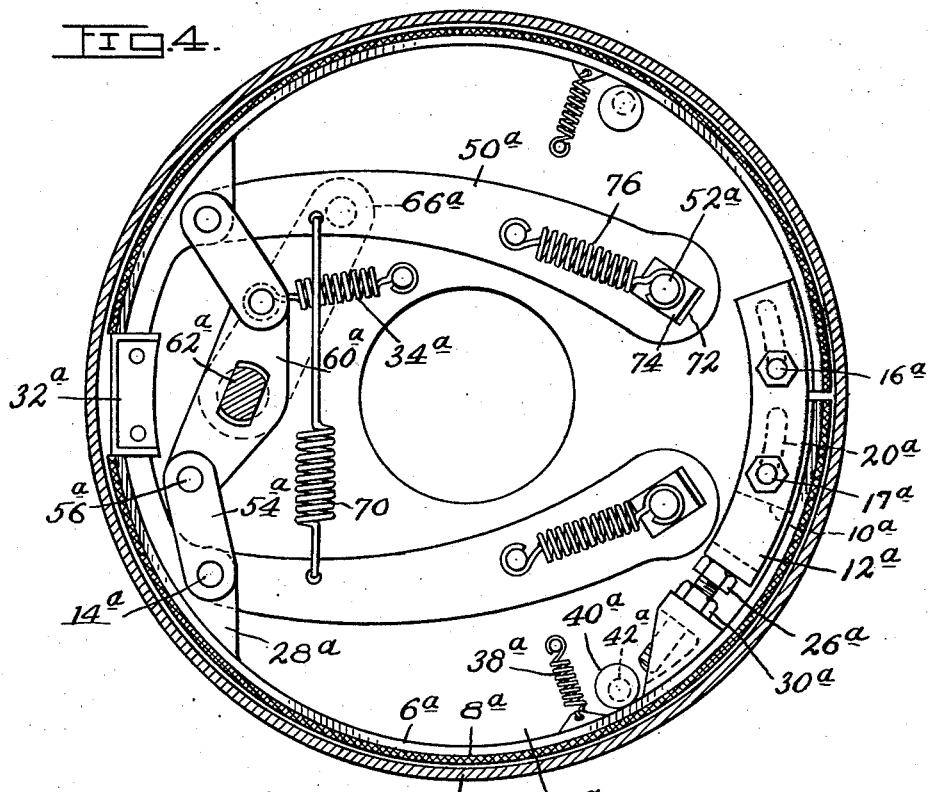
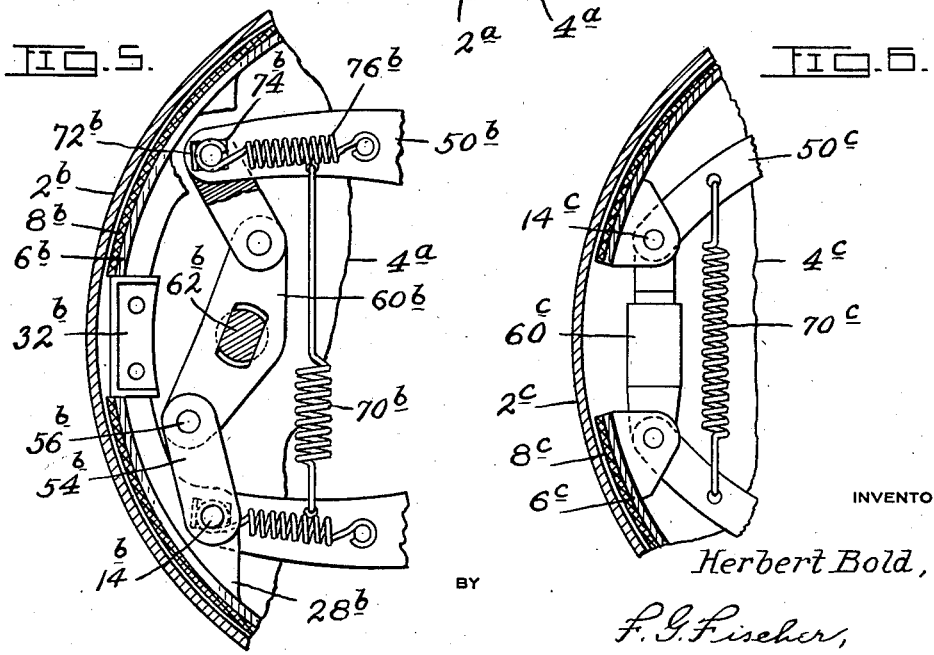
INVENTOR:
Herbert Bold,
F. G. Fischer,
ATTORNEY.

Patented Sept. 22, 1936

2,055,330

UNITED STATES PATENT OFFICE 2,055,330

VEHICLE BRAKE

Herbert Bold, Kansas City, Mo.

Application March 11, 1935, Serial No. 10,505

4 Claims. (Cl. 188—78)

The present invention relates to internal expanding brakes for automotive vehicles, and one object is to provide a mechanism of this character in which the brake-band is adapted to be expanded uniformly throughout its length to effect even wearing of the brake lining and to obtain maximum braking action upon the brake-drum whether the latter is rotating in a clockwise direction or in a counter-clockwise direction.

Another object is to provide a brake mechanism with adjusting means whereby the brake-band may be maintained in concentric relation to the brake-drum so that the braking action will not tend to distort said brake-drum or wear the friction lining unevenly.

A further object is to arrange the parts for easy and quick adjustment, to the end that maximum braking action may be had over a long period of time before repairs are required.

Another object is to provide an internal expanding brake which may be operated by either mechanical or hydraulic actuating mechanism.

Other objects will hereinafter appear and in order that the invention may be fully understood, reference will now be had to the accompanying drawings, in which:

Fig. 1 shows the brake-drum in vertical section with the internal mechanism of the brake in elevation.

Fig. 2 is an irregular cross section on line 2—2 of Fig. 1.

Fig. 3 is a fragmentary detail showing a dial and a pointer employed in adjusting the brake-band concentrically with the brake-drum.

Fig. 4 shows a modification of the brake mechanism.

Figs. 5 and 6 show other modifications of the brake mechanism.

Referring more particularly to the form disclosed by Figs. 1 to 3, inclusive, 2 designates a brake drum one of which may be secured to each wheel, not shown, of a motor vehicle. Dust and other foreign matter is excluded from the interior of the brake drum 2 by a stationary back plate 4 which is fixed to the rear axle housing of the motor vehicle in the usual manner.

6 designates a brake-band which is faced with suitable friction material 8 and equipped at its ends with fixed segments 10 upon which segmental plates 12 are adjustably secured by means of bolts 14 and 16 which extend through holes in the plates 12 and slots 18 and 20, respectively, in the segments 10. Upon loosening nuts 22 and 24 on the bolts 14 and 16, respectively, the plates 12 may be adjusted forwardly or backwardly upon the segments 10. The brake band 6 may be expanded to take up wear of the friction lining 8 by means of a pair of set screws 26 threaded in lugs 28, fixed to the brake band 6, and abutting the rear ends of the respective segmental plates 12. Upon loosening the nuts 22 and 24 and rotating the set screws 26 in the proper direction the brake band 6 may be expanded for the purpose above stated while the forward ends of the segmental plates 12 are held against an intervening anchor 32 fixed to the back plate 4. Jamb nuts 30 are provided for securing the set screws 26 at any point of their adjustment.

The forward ends of the segmental plates 12 are normally held against the anchor 32 by means of coil springs 34 each of which is secured at one end to the back plate 4 and at its opposite end to a lug 36 at the rear end of the respective segmental plate 12. The coil springs 34 also cooperate with a pair of coil springs 38 in holding the brake drum 6 in released position and concentric to the brake drum 2, as shown by Fig. 1. Each coil spring 38 is connected at one end to the back plate 4 and at its opposite end to the brake band 6.

A pair of eccentrics 40 cooperate with the springs 34 and 38 in holding the brake band 6 concentric with the brake drum 2, and also cooperate with the set screws 26 in adjusting the brake band 6 to take up wear of the friction material 8. Each eccentric 40 is fixed to one end of a spindle 42 rotatably mounted in and extending through the back plate 4. Each spindle 42 is provided at its outer end with a pointer 44 which cooperates with a dial 46, on the back plate 4, in indicating the location of the high radius of the eccentric 40 for the information of a mechanic when adjusting the brake band 6.

A system of linkage for expanding the brake band 6 will now be described in detail. 50 designates a pair of long links operably mounted at one end on pivots 52 carried by the back plate 4. The other end of each long link 50 is operably connected to a pair of short links 54 by a spindle 56 upon which a pair of antifriction rollers 58 are operably mounted for cooperation with an intervening free floating cam 60. The cam 60 is arranged transversely to and slidably mounted in a shaft 62 mounted in a bearing 64 secured to the outer side of the back plate 4. The outer end of the shaft 62 has a fixedly mounted lever 66 which may be connected in the usual manner to the customary brake lever, not shown, controlled by the driver of the motor vehicle.

The operation of the brake mechanism is as follows: When the lever 66 is pulled forwardly the high portions at the ends of the cam 60 engage and force the two pairs of rollers 58 outwardly during which operation they are guided by the respective links 50. As the rollers 58 are forced outwardly they in turn operate the long links 50 and the short links 54 which expand the brake band 6. As the brake band 6 is expanded its ends move away from the intervening anchor 32 until the friction material 8 engages the revolving brake drum 2 which then carries the brake band 6 therewith until one of the adjusting plates 12 (it depending on the direction of rotation of the brake drum 2) is carried forward into contact with the adjacent side of the anchor 32. When this occurs the cam 60 is forced to slide in the shaft 62 and thereby operate the other links 50 and 54 which then cooperate in maintaining the brake band 6 in expanded position. On completion of the foregoing operation the entire face of the friction material 8 is in contact with the friction face of the brake drum 2, and thereby provides maximum braking action and insures even wear of the friction material 8.

To release the brake it is only necessary to move the lever 66 backwardly, whereupon the brake band 6 and the friction material 8 are contracted until checked by stops 68 fixed to the long links 50 and projecting into the paths of the two adjacent short links 54, as shown by Fig. 1.

In the modified form shown by Fig. 4 the brake mechanism in some respects is similar to that shown by Fig. 1, as is evidenced by corresponding reference numerals with exponents a. One difference resides in a floating lever 60a which is substituted for the cam 60 and connected at its ends to the spindle 56a in order to act directly upon the short links 54a instead of through the rollers 58 as in the form shown by Fig. 1. The links 54a are connected by pivots 14a to lugs 28a fixed to opposite sides of the brake-band 6a. Further differences reside in a short spring 34a cooperating with a longer spring 70 in contracting the brake band 6a, and the long links 50a are mounted for limited longitudinal movement to render their operation more flexible when cooperating with the short links 54a in expanding and contracting the brake band 6a. As shown by Fig. 4 the rear ends of the long links 50a are slotted as indicated at 72 and slidably mounted upon the rectangular portions 74 of the pivots 52a. Normally the long links 50a are pulled backwardly by retractile springs 76 to hold the forward ends of the slots 72 against the adjacent ends of the respective rectangular portions 74.

A pair of brake shoes 6a lined with friction material 8a are substituted for the brake band 6 of Fig. 1. An anchor 32a fixed to the back plate 4a is interposed between adjacent ends of the brake shoes 6a. The other end of one of the brake shoes 6a is provided with a fixed segment 10a on which a segmental plate 12a is adjustably secured by bolts 16a and 17a extending through slots 20a in said fixed segment 10a. One end of the segmental plate 12a abuts a set screw 26a threaded in a lug on the companion brake shoe 6a for taking up wear of the brake lining 8a. The set screw 26a is provided with a jamb nut 30a for holding it at any point of its adjustment.

A pair of eccentrics 40a, fixed to spindles 42a cooperate with springs 38a and the springs 34a and 70 in holding the brake shoes 6a concentric with the brake drum 2a. Said eccentrics 40a may also be used in cooperation with the set screw 26a in taking up wear of the brake lining 8a.

The lever 60a is slotted and slidably mounted upon the flat portion of a shaft 62a carrying a fixedly mounted lever 66a which may be connected in the usual manner to the brake lever controlled by the driver.

In practice, when the lever 66a is swung forwardly it partially rotates the shaft 62a causing the lever 60a to move the links 54a outwardly, which in turn move the brake shoes 6a outwardly. The brake shoes 6a are moved outwardly away from the intervening anchor 32a until the frictional material 8a engages the revolving brake drum 2a, which in turn carries the brake shoes 6a therewith until one of them (it depending on the direction of the rotation of the brake drum 2a) is carried forward into contact with the adjacent side of the anchor 32a. When this occurs the lever 60a is forced to slide on the shaft 62a and thereby operate the other link 54a which cooperates in maintaining the brake shoes 6a in active position. On completion of the foregoing operation, the entire face of the friction linings 8a are in contact with the friction surface of the brake drum 2a, and thereby provide maximum braking action which insures even wear of the friction material 8a. To release the brake shoes 6a from the brake drum 2a it is only necessary to swing the lever 66a backwardly, whereupon said brake shoes 6a are drawn inwardly by the springs 34a, 38a and 70 until checked by contacting with the intermediate anchor 32a.

In the modified form shown by Fig. 5, the construction and operation of some of the parts are similar to some of the parts disclosed by Fig. 4, as is evidenced by corresponding reference numerals with exponents b, the chief difference being that pivots 52b with rectangular portions 74b have been transferred from the rear ends to the forward slotted ends 72b of the long links 50b along with the springs 76b.

In the form shown by Fig. 6 the short links have been dispensed with and the long links 50c are actuated by hydraulic means 60c.

In addition to the forms shown and described, I reserve all rights to such other forms and modifications as properly fall within the spirit and scope of the invention as claimed.

Having thus described my invention, what I claim and desire to secure by Letters Patent, is:

1. In a brake mechanism, a rotatable drum, a stationary back plate adjacent to said drum, braking means movable to frictionally engage said drum, a pair of short links operably connected to said braking means, a pair of long links pivotally connected to said short links and the stationary back plate, means for limiting the movement of the links in one direction, and suitable means for actuating said links to move said braking means into engagement with said drum.

2. In a brake mechanism, a rotatable drum, a stationary back plate adjacent to said drum, braking means movable to frictionally engage said drum, a pair of short links operably connected to said breaking means, a pair of long links pivotally connected to said short links and the stationary back plate, stops fixed to the long links, spring means for normally contracting said braking means and holding the short links against said stops, and suitable means for actuating said links to move said braking means into engagement with said drum.

3. In a brake mechanism, a rotatable drum, a stationary back plate adjacent to said drum, braking means movable to frictionally engage said drum, a pair of short links operably connected to said braking means, a pair of long links pivotally connected to said short links and the stationary back plate, antifriction rollers journaled upon the pivots connecting the short links and the long links, and means interposed between said rollers for expanding the braking means.

4. In a brake mechanism, a rotatable drum, a stationary back plate adjacent to said drum, braking means movable to frictionally engage said drum, a pair of short links operably connected to said braking means, a pair of long links pivotally connected to said short links and the stationary back plate, antifriction rollers journaled upon the pivots connecting the short links and the long links, and suitably actuated cam means for actuating said rollers to move the braking means into engagement with said drum.

HERBERT BOLD.